Nov. 27, 1951  J. R. STOVALL, JR., ET AL  2,576,488
CRIMPED PLATE CAPACITANCE STRAIN GAUGE
Filed Jan. 20, 1950
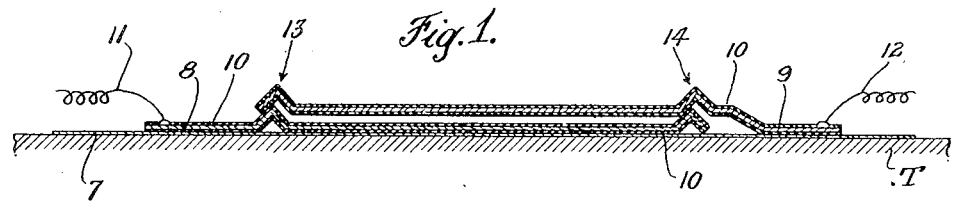
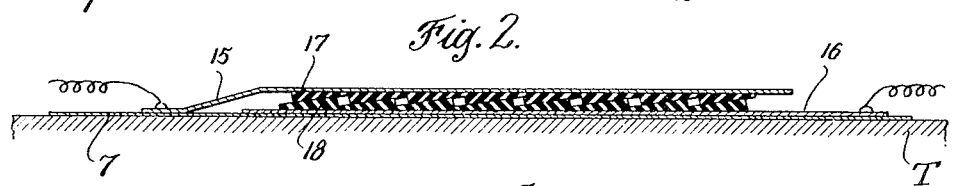
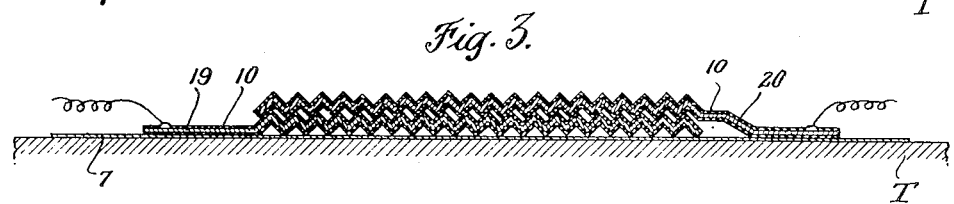
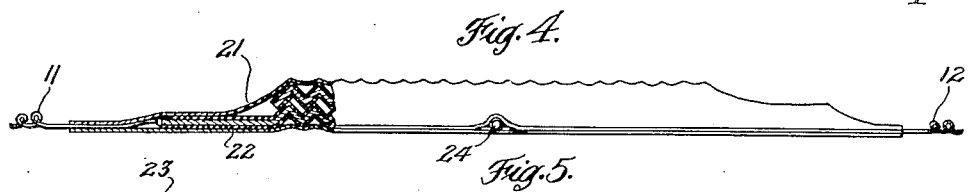
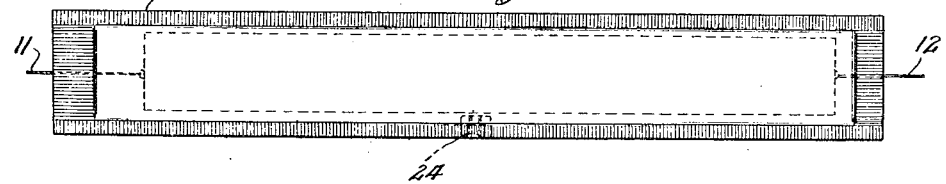
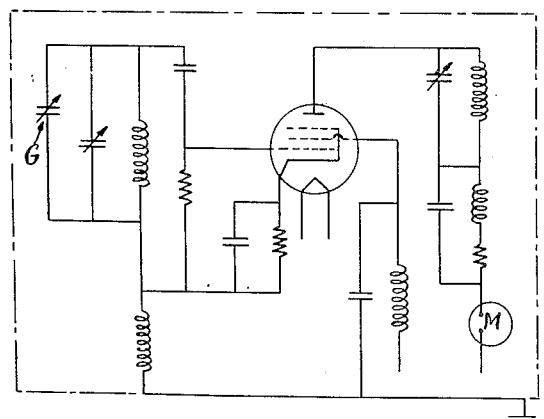
Inventors
John R. Stovall Jr.
Irving Weintraub
By
Attorneys Patented Nov. 27, 1951

2,576,488

UNITED STATES PATENT OFFICE 2,576,488

CRIMPED PLATE CAPACITANCE STRAIN GAUGE

John R. Stovall, Jr., Doylestown, and Irving Weintraub, Neshaminy, Pa., assignors to Tinius Olsen Testing Machine Company, Willow Grove, Pa., a corporation of Pennsylvania Application January 20, 1950, Serial No. 139,561

9 Claims. (Cl. 175—41.5)

This invention relates to capacitance type strain gages.

In a strain gage of the capacitance type where the gage is made of a pair of relatively movable plate elements which are adapted to be shifted with relation to each other in accordance with strain of the piece being tested, if the plates are of simple type of flat construction only a very slight absolute change in capacity between the plates will occur upon relative shifting movement of the plates in accordance with the strain of the test piece. Plate configuration to achieve high per cent capacity change results in no increase in absolute capacity change generally.

The present invention contemplates a form of capacitance strain gage incorporating features adapted to augment or multiply change in capacity in relation to change in strain of the test piece. This is accomplished according to the invention by the employment of a pair of relatively shiftable plate elements having crimped or similar interengaging surfaces, acting in the manner of a wedge, to thereby effect relative separation of the plates in a direction transverse the mean plane thereof and thereby augment capacity change in relation to shifting movement of the plates under the influence of straining of the test piece.

The invention further contemplates the provision of means for maintaining uniform pressure of interengagement of a pair of condenser plates incorporated in a capacitance type of strain gage, to thereby increase the uniformity of response of the gage under various operating conditions.

How the foregoing and other objects and advantages are attained will appear more fully from the following description referring to the accompanying drawings, in which:

Figure 1 is a longitudinal sectional view through one form of gage constructed according to the present invention;

Figures 2 and 3 are views similar to Figure 1 but illustrating modified gage arrangements according to the invention;

Figure 4 is a view of a gage similar to that of Figure 3 but provided with an enclosing envelope for maintaining uniform pressure of interengagement of the plates, as will further appear, this figure having a portion of the enclosing envelope broken away;

Figure 5 is a top plan view of the arrangement of Figure 4; and

Figure 6 is a schematic diagram of a measuring circuit of a type with which gages according to the invention may be used.

As seen in Figure 1 the gage is adapted to be mounted on a piece to be tested, indicated at T. The gage here shown is mounted on and preferably adhesively secured to a base sheet, such as a strip of paper 7 which may advantageously have marginal edges projecting at all sides, to thereby facilitate pasting or adhesively securing the gage to the test piece. The gage itself is made up of two metal plates, advantageously of metal foil such as aluminum foil, these two plates being indicated at 8 and 9. Each of these plates is coated on one or both sides with an insulating material, preferably a dielectric material of appropriate dielectric properties, such coatings being indicated at 10. In a typical gage of the kind here involved, the overall dimensions of the gage itself may be something like 1" long (i. e., the dimension from left to right in Figure 1), and ⅜" wide (i. e., the dimension perpendicular to the plane of the drawing), so that the gage as a whole is of strip-like form.

As will be seen, the two gage plates overlie each other, although each has a projecting tab, arranged at opposite ends, for convenience in attachment of the connections 11 and 12 by means of which the gage is coupled to the measuring circuit. The two plates of Figure 1 are also provided with angular crimps in the regions indicated at 13 and 14. Because of these crimps, it will at once be seen that the relative shifting movement of the plates 8 and 9 which will occur upon straining of the piece T will result in a wedge action at the regions of crimping, causing the upper plate to rise and move away from the lower plate and thereby change the plate spacing and thus the capacity of the gage. This change in capacity will roughly conform with per cent strain and serves to accentuate the per cent capacity change in relation to per cent strain, as compared with a simple flat plate gage in which the shifting movement of the two plates is relied upon alone to alter the capacity of the gage. The uncrimped and unsupported plate span of Figure 1 may be longitudinally crimped for stiffening, this having no effect on the aforementioned behavior.

It should be understood in connection with the showing of Figure 1 and also of various of the other figures that the relationship of dimensions, especially thicknesses of the plates themselves and of the dielectric layers is not intended to accurately indicate what would be employed in practice. In practice the plates are preferably made up of relatively thin metal foils, such as aluminum, zinc and tin foil, of a thickness of from about 0.0005" to about 0.003", a plate thickness of about 0.0015" being satisfactory. The dielectric layers may conveniently comprise quite thin coatings, for instance down to about .0001".

The dielectric material may comprise any of a variety of resin type materials having appropriate dielectric properties and further preferably also having at least some self-lubricating qualities. Vinyl type resins may be utilized for this purpose, as may also silicone compounds. Indeed certain of the silicone compound materials of liquid or semi-liquid consistency will serve the purpose.

A modified arrangement is illustrated in Figure 2, in which the gage plates 15 and 16 are again mounted upon paper strip 7, but in this form the plates themselves are flat in the effective capacitor area thereof. Each plate, however, is provided with a coating of dielectric material as indicated at 17 and 18, which material is solid and is formed with serrations, generally of sawtooth shape, which interfit to provide the desired wedge action and thereby cause plate separation when the plates are relatively shifted in the mean plane thereof under the influence of straining of the piece being tested. The action of the gage of Figure 2 is thus similar to the action of the gage of Figure 1.

In still another embodiment, shown in Figure 3, the plates 19 and 20 are again mounted on a paper strip such as shown at 7 but in this case the plates are crimped substantially throughout the effective areas thereof, so as to achieve an averaging effect from the crimping and thereby increase the uniformity of response of the gage in relation to per cent strain of the piece being tested. Dielectric coatings 10 are provided on the plates of Figure 3, as in Figure 1.

Uniformity of action of gages of the kind shown in Figures 1, 2 and 3 is somewhat dependent upon maintenance of uniformity of pressure of engagement between the two plates, due to change of average plate spacing with pressure change, and according to the invention, such uniformity of interengagement of the plates, while yet permitting the freedom for shifting movement, is achieved by enclosing the entire gage within an envelope made, for example, of some pliable material such as polyethylene film. This envelope as shown in Figures 4 and 5 is made up of an upper layer 21 and a lower layer 22 which have marginal edges projecting at all sides of the gage which may be fused together as indicated at 23 in Figure 5 to thereby seal the gage within the envelope. The connecting leads 11 and 12 may be sealed in the end portions of the envelope. The envelope is adapted to be evacuated, for instance by the connection of a pressure pump to an apertured fitting 24 which is also sealed between the upper and lower sheets 21 and 22 of the envelope. After reducing the pressure within the envelope, the aperture in the fitting 24 may be plugged or, if desired, this fitting may be made of a collapsible plastic material capable itself of being sealed by application of pressure and heat.

The action of atmospheric pressure on the envelope serves to maintain intimate and uniform interengagement of the plate elements within the envelope, regardless of specimen surface contour, changing plate spacing, etc.

In Figure 6 there is illustrated one form of measuring circuit with which gages of the kind described above may be used. The special features of this circuit need not be considered in detail herein although it may be mentioned that the gage itself may be coupled thereto in the position of the condenser element indicated at G. A meter such as a milliammeter shown at M in Figure 6 may be calibrated in units of strain.

We claim:

1. A gage comprising two plane condenser plate elements mounted in parallel confronting relationship one to the other, and on the inner surface of each such element a layer of dielectric material, the inner face of the dielectric material of each such layer being defined in part by a surface inclined with respect to the plane of a plate element, the inclined portion of one such layer being parallel to and in sliding engagement with the inclined portion of the other said layer.

2. A gage comprising a pair of condenser plate elements, mounted in spaced apart relationship with freedom for relative movement in a first direction toward and away from one another, and in a second direction generally normal to the first, a dielectric element between the plates, one of said elements having wedge means including a surface inclined with respect to the mean planes of movement in said first direction and in said second direction, and on the other element second wedge means including a surface parallel to the first said surface and in sliding contact therewith.

3. A gage comprising two plate elements mounted in generally parallel confronting relationship, a dielectric layer applied to the inner surface of one of said elements, said elements having freedom for relative movement in a plane generally parallel to the mean plane containing one of said elements, and each of said elements including a portion inclined from the remainder thereof to provide on each such element a wedge shaped crimp, each such crimp being positioned to engage the other to effect separation between said elements upon such relative movement.

4. A gage comprising two condenser plate elements mounted in generally parallel confronting relationship and a dielectric element lying therebetween, an adjacent pair of said elements having freedom for relative movement in a plane with respect to and parallel to the mean plane of one of said plate elements, each member of said pair having wedge means, each said means including a surface in sliding contact with the corresponding surface of the other, and said surfaces being obliquely inclined with respect to said plane in the direction of said movement.

5. A gage according to claim 4 in which the plate elements comprise crimped metal foil and in which said dielectric element is secured to at least one of the plates.

6. A gage according to claim 4 in which at least one of the plate elements comprises a flat plate separated from the other plate element by said dielectric element which is carried thereby and in which one of said inclined surfaces is formed on the dielectric material.

7. A gage in accordance with claim 4 in which said dielectric element comprises a film of a dielectric material having lubricating properties.

8. A construction in accordance with claim 4 and further including an evacuated envelope of pliable sheet material enclosing said plate elements and serving to maintain interengagement thereof.

9. A capacitance type strain gage, comprising a pair of superimposed condenser plate elements separated by dielectric material and having interfitting crimps providing for relative separation of the plate elements according to relative shifting movement thereof in the mean plane of the plate elements under the influence of straining, at least part of the abutting portions of the interfitting crimps being angularly disposed to the mean plane of the plate elements, and an evacuated envelope of pliable sheet material enclosing the plate elements and serving to maintain interengagement thereof.

JOHN R. STOVALL, Jr.
    IRVING WEINTRAUB.

REFERENCES CITED

The following references are of record in the file of this patent:

UNITED STATES PATENTS

| Number | Name | Date |
| --- | --- | --- |
| 1,611,990 | Bonine | Dec. 28, 1926 |
| 1,890,313 | Caine | Dec. 6, 1932 |
| 1,895,242 | Cowan | Jan. 24, 1933 |
| 2,065,934 | Deutschmann | Dec. 29, 1936 |
| 2,203,283 | Miller | June 4, 1940 |